United States Patent

Tsunoda

[15] 3,689,969
[45] Sept. 12, 1972

[54] METHOD OF FORMING A CLAW PORTION OF THE FRONT WHEEL JOURNAL FORK OF A BICYCLE

[72] Inventor: Masashi Tsunoda, Aichi-ken, Japan
[73] Assignee: Tsunoda Jitensha Kabushiki, Aichi-ken, Japan
[22] Filed: July 29, 1970
[21] Appl. No.: 59,297

[52] U.S. Cl. .....................29/150, 219/150, 219/152
[51] Int. Cl. .............................................B23p 13/00
[58] Field of Search ......219/152, 150, 149; 280/279; 29/400, 150

[56] References Cited

UNITED STATES PATENTS

| | | | |
|---|---|---|---|
| 2,513,739 | 7/1950 | O'Neill | 219/149 |
| 2,570,547 | 10/1951 | Hanna | 219/152 |
| 2,581,774 | 1/1952 | Stone | 219/152 |
| 2,953,674 | 9/1960 | Grodt | 219/152 |
| 3,067,321 | 12/1962 | Westin et al. | 219/152 |
| 3,477,741 | 11/1969 | Ross | 280/279 |
| 3,507,516 | 4/1970 | Fretz | 280/279 |

*Primary Examiner*—John F. Campbell
*Assistant Examiner*—Richard Bernard Lazarus
*Attorney*—Berman, Davidson & Berman

[57] ABSTRACT

A method of forming a claw portion of the front wheel journal fork of a bicycle, including the steps of axially squeezing a metal pipe, having one end of reduced section, between a pair of chuck electrodes, the electrode seating said reduced section end of the pipe having a die cavity of a desired shape for an intermediate form of the claw portion, while simultaneously applying an electric potential to said electrodes, whereby to soften and form said reduced section end of the pipe to a shape conforming to that of the die cavity, pressing said shaped end of the pipe to flatten said end, shearing said flattened end to a desired claw contour, and punching a hole and a slot in said flat and contoured claw portion.

8 Claims, 6 Drawing Figures

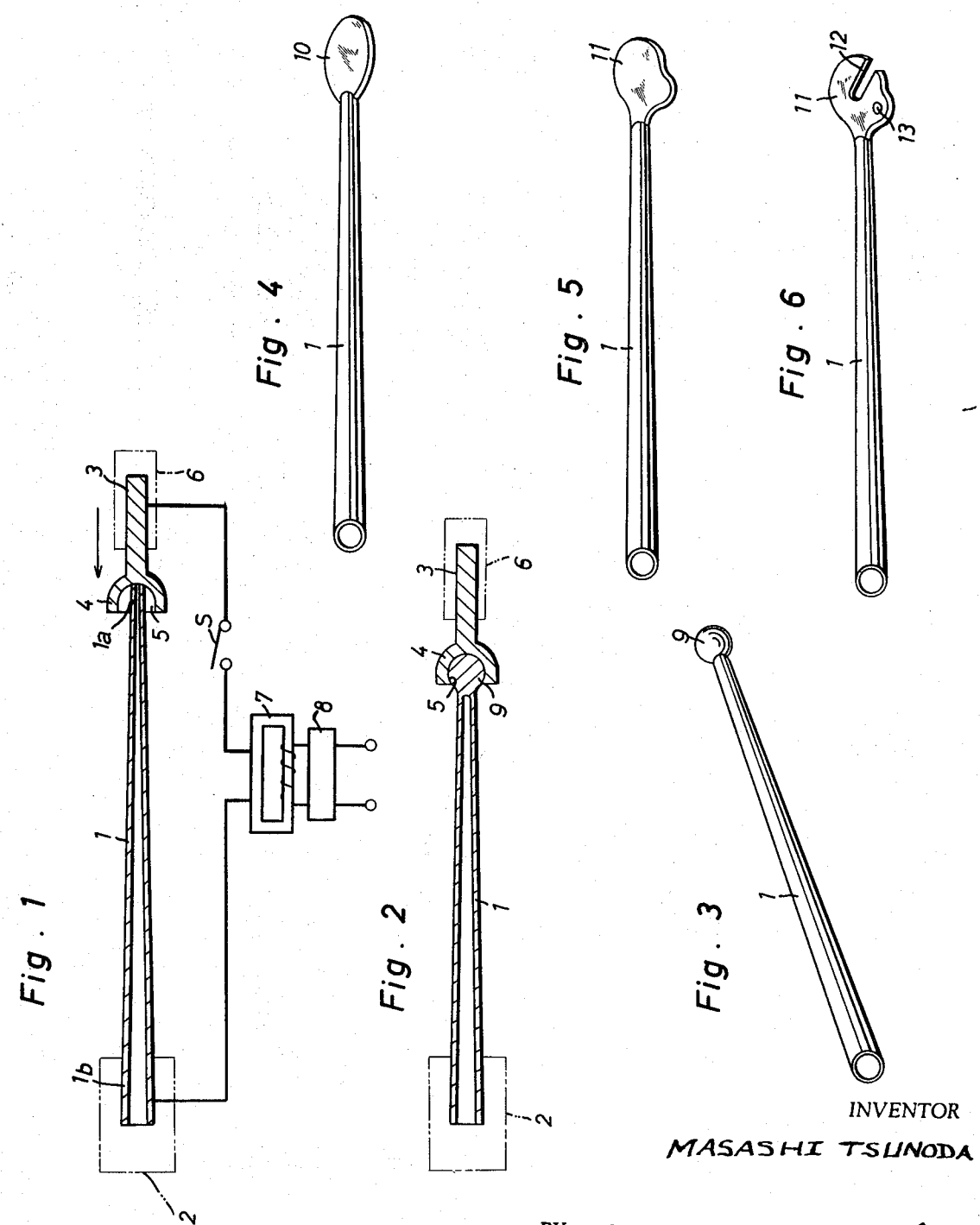

METHOD OF FORMING A CLAW PORTION OF THE FRONT WHEEL JOURNAL FORK OF A BICYCLE

BACKGROUND OF THE INVENTION

1. Field of the Invention

The present invention relates to a manufacturing method for a front fork element of a bicycle, and more particularly to a method of forming a claw portion on the front fork.

The claw portion of the front fork for journaling the shaft of a bicycle wheel has to be made strong enough to carry the weight of the bicycle frame, its rider and other loads. The present manufacturing method is suitable for mass production at the lowest possible cost.

2. Description of the Prior Art

The most common conventional method for making a bicycle front fork includes forging and cutting steps. The forging steps make for poor production efficiency and require a large amount of labor. No conventional method exists which enables mass production. Conventional products are not durable, precise, nor of balanced good quality.

SUMMARY OF THE INVENTION

The present method of forming a claw portion on the front fork of a bicycle to journal a wheel, comprises the steps of applying an electric current of high amperage and low voltage through a pipe to be used as one element of the front fork of the bicycle, one end of the pipe being engaged in a fixed chuck electrode which is grounded, the other end of the pipe being of reduced area and seated in a die, having a cavity of a desired shape, installed in a movable electrode, simultaneously with the passage of electricity pressing the pipe between the fixed and movable electrode so that said other end of the pipe is softened by heat produced by high resistance to passage of electric current at the contacting portion of reduced area of the pipe in the die cavity in the movable electrode, causing said reduced area end of the pipe to be formed to a shape in correspondence with that of the die cavity, pressing the formed end of the pipe as produced in the die into a flat shape, shearing said flat end of the pipe in a desired contour, and punching a hole and a slit in said flat shaped and contoured end portion to complete the claw portion.

It will be apparent from the above that a prime object of the present invention is to provide a method of fabricating the claw portion of the front fork of a bicycle which is capable of realizing efficient mass production.

Another important object of the present invention is to utilize electric current passing along a pipe to be fabricated into the fork element so that the current density in the pipe is greatest in a reduced area of the pipe at one end which is seated in a die cavity of a supporting electrode, whereby all of said reduced area of the pipe is heated sufficiently by the passage of the current to soften or semi-melt and to be deformed by the axial pressure of the supporting die electrode into the shape of the die cavity.

Still another object of the invention is to provide an improved method for forming the claw portion of the front fork of a bicycle which is easy to follow, inexpensive to use, and capable of rapid fabrication of front forks in mass production quantities.

Yet another object of the invention is to provide an improved method for forming the claw portion of the front fork of a bicycle which method results in products of increased durability, more precise dimensions, and improved quality.

BRIEF DESCRIPTION OF THE DRAWINGS

Various other objects and advantages of the invention will be readily apparent from the following detailed description, when considered in connection with the accompanying drawing forming a part thereof, and in which:

FIGS. 1 to 6 illustrate the process of the invention in the sequence of its steps;

FIG. 1 is a diagrammatic showing of a pipe member held and pressed in apparatus for applying electric current to soften and form a globe at one end of the pipe;

FIG. 2 is a longitudinal sectional view through the pipe and part of the apparatus showing the formed globe at the end of the pipe;

FIG. 3 is a perspective view of the pipe after the step illustrated in FIGS. 1 and 2 is completed;

FIG. 4 is a perspective view of the pipe after flattening;

FIG. 5 is a perspective view of the pipe member after shearing; and

FIG. 6 is a perspective view of the pipe after punching and the article is completed.

DESCRIPTION OF THE PREFERRED EMBODIMENT

Referring to FIG. 1, the reference numeral 1, generally designates a tapered pipe member of iron, aluminum or other metal intended for use as a front fork of a bicycle.

The pipe 1 is held horizontally with a root portion 1b thereof engaged in a chuck electrode 2 fixed on a base of suitable material, not shown, and electrically grounded. A die 4 having a cavity 5 of half-globe shape is integrally fixed to a movable electrode 3. The movable electrode is insulatedly engaged in a sliding member 6 for movement to the right and left horizontally so that its axis stays in a line with that of pipe 1. The sliding member 6 is connected to a pressing device, not shown, and is free to slide to the right and left so as to produce corresponding movements of the electrode 3. The fixed electrode 2 and the movable electrode 3 are respectively connected to a source of electric power through a main switch S and a transformer 7 so as to supply an electric current of high amperage, for instance 100 amperes, and low voltage, for example 15 volts. A time control device 8, for instance a conventional timer, is connected across the transformer primary and power source so as to control the current flow for a pre-determined period of time.

The sliding member 6 is moved to the left in FIG. 1, as shown by an arrow in the figure, so as to seat the end 1a of the pipe in the die cavity 5, in electrical contact with the die 4 and with its support, the movable electrode 3. At the same time, the main switch is closed to apply the electric power to the ends 1a, 1b, of the pipe. This produces rapidly and within one second, electrical resistance heat of high temperature, approximately 900° C at the pressure contact area of the smaller end 1a of the pipe. The resultant heat softens or semi-melts the end of the pipe in the die cavity 5. Since the tapered pipe has greatest current density at its smaller end, the greatest heat is concentrated at this end and the remainder of the pipe is not heated sufficiently by the electric current to soften or bend.

Meanwhile the pressing device (not shown), keeps pressing the movable electrode toward the left. Thus, the softened end 1a of the pipe 1 is shaped into a globe 9 approximately as shown in FIG. 2. As the end 1a of the pipe softens, the temperature of electrical heat drops to approximately 50° C because of the decrease of resistance at the pressure contact area and its increase in size due to softening and formation of the globe 9. When the movable electrode reaches a predetermined position, after about 20 seconds from the start of its movements, the electric current is shut off by the timer 8.

Immediately thereafter, the sliding member is retracted and the fixed chuck electrode 2 disengaged from the pipe 1. This ends the first step, and an uncompleted product at this point of fabrication is shown in FIG. 3.

Using a thinner wall at the smaller end of the pipe aids in producing higher current density and concentrated heat. Obviously pipes of other than tapered form, but with a reduced cross-sectional area may be utilized.

The second step of the process is to flatten the globe portion 9 of the pipe in a hot or cold pressing machine (not shown), such flattened shape being shown by the reference numeral 10 in FIG. 4.

In the third step of the process, the flattened portion 10 is sheared by a shearing machine to present a claw contour suitable to journal the shaft of the bicycle wheel. The sheared portion is shown by the reference numeral 11 in FIG. 5.

To complete the item, the fourth or last step of the process involves punching the flat and contoured portion 11 to form a slit 12 and a small hole 13 of appropriate sizes in the desired locations, as for example shown in FIG. 6. This completes the fabrication process resulting in a front fork for a bicycle as illustrated in the last-named figure.

In the above described embodiment, the electric current between the fixed chuck electrode 2 and the movable electrode 3 is for example given as 100 amperes at 15 volts. These values, however, should be varied in accordance with the different metal materials used in forming the pipe member 1. Nor is it absolutely necessary for the die cavity 5 to be of globe shape, but other shapes such as ellipsoidal, cylindrical, etc. may be used in accordance with variations of style of the claw portion 11.

While a certain specific embodiment of the invention has been described and illustrated, it is obvious that many modifications thereof are possible. The invention, therefore, is not intended to be restricted to the exact showing of the drawings and description thereof, but is considered to include reasonable and obvious equivalents.

I claim:

1. A method of forming a claw portion of the front wheel journal fork of a bicycle, comprising the steps of producing a metal pipe having one end of reduced cross section as compared with the other end squeezing said metal pipe between a pair of chuck electrodes, the one of said electrodes seating the reduced section end of the pipe having a die cavity of desired contour suitable for an intermediate shape of the claw portion, while simultaneously applying an electric potential to said electrodes so that the current density in said end of reduced cross section is greater than the current density in said other end, whereby to form said reduced section end of the pipe to a shape conforming to that of the die cavity, flattening said shaped end of the pipe by pressure, shearing said flattened end portion to a desired claw contour, and punching a hole and a slit in said flattened and contoured claw portion.

2. A method of forming a claw portion of the front wheel journal fork of a bicycle according to claim 1, wherein said pipe is produced by a uniform taper along the pipe length and the smaller end is seated in said die cavity, whereby to produce a higher current density and greater heating at said smaller end of the pipe.

3. A method of forming a claw of the front wheel journal fork of a bicycle according to claim 2, wherein said pipe is produced with a thinner wall at said smaller end than at the larger end.

4. A method of forming the claw portion of the front wheel journal fork of a bicycle according to claim 1, wherein said electric potential is of high amperage and low voltage, thereby producing sufficient resistance heat at the reduced section pipe end seated in said die cavity to soften or semi-melt said pipe end.

5. A method of forming the claw portion of the front wheel journal fork of a bicycle according to claim 1, wherein one of said chuck electrodes is fixed and the other is movable axially of the pipe held therebetween.

6. The method of claim 1, wherein said die cavity of said chuck electrode is of semisphere shape to form the pipe end seated therein into approximately a corresponding globe shape.

7. The method of claim 1, wherein said flattening step is performed by applying heat and pressure.

8. The method of claim 1, wherein said flattening step is performed in a cold press.

* * * * *